H. P. KRAFT.
NUT OR THE LIKE.
APPLICATION FILED APR. 22, 1918.

1,282,871.

Patented Oct. 29, 1918.

WITNESS:
René Spuine

INVENTOR
Henry P. Kraft,
By Attorneys,
Fraser, Funk & Myers

UNITED STATES PATENT OFFICE.

HENRY P. KRAFT, OF RIDGEWOOD, NEW JERSEY.

NUT OR THE LIKE.

1,282,871. Specification of Letters Patent. Patented Oct. 29, 1918.

Application filed April 22, 1918. Serial No. 229,899.

*To all whom it may concern:*

Be it known that I, HENRY P. KRAFT, a citizen of the United States of America, residing at Ridgewood, in the county of Bergen and State of New Jersey, have invented certain new and useful Improvements in Nuts or the like, of which the following is a specification.

This invention relates to nuts and washers for bolts or the like, and aims to provide certain improvements therein.

The invention is applicable to nuts of any description, although in the preferred form illustrated it is particularly adapted for nuts for use in connection with pneumatic tire valves.

Nuts for use on pneumatic tire valves are usually provided with a body portion having a recess for receiving a packing washer and an interior thread adapted to engage the screw-thread on the valve shell. By reason of the depth of the nut it is expensive to form it out of a solid bar of metal. According to the present invention there is provided a nut formed of sheet metal which has a body portion and a cylindrical portion, the cylindrical portion being of smaller diameter than the body portion, and projecting in the same direction, whereby there is formed between them an annular recess adapted to receive a packing washer. Such nuts are provided with a wrench face in the form of flats, knurls, or the like, and when this wrench face is sufficiently broad to become efficient, the recess in the nut becomes so deep that the leather or other washers of ordinary thickness are not deep enough to extend beyond the lower face of the nut. According to the present invention I provide a nut having a filling piece in its annular recess, preferably formed of sheet metal which forms a rest or seat for the washer, and holds it so that its face extends beyond the lower face of the nut, so that it may be effectively used. Certain other features of improvement are also provided.

Referring to the accompanying drawings, Figure 1 is a side elevation of one form of nut;

Figure 1:
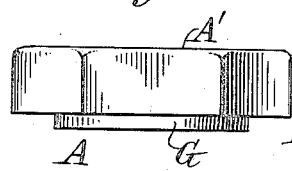
Figure 3:
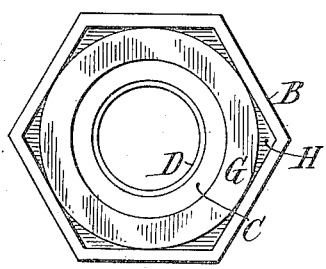
Fig. 3 is a bottom view thereof.
Figure 8:
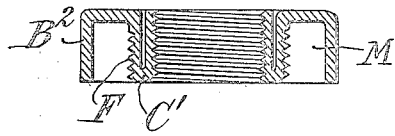
Fig. 8 is a diametrical section of a modified form of nut.
Figure 7:
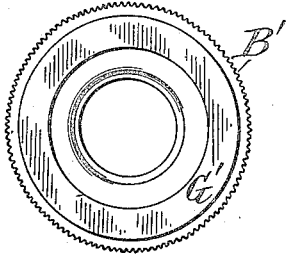
Fig. 7 is a bottom plan of Fig. 6.

Referring to the drawings, let A indicate the nut as a whole, which is preferably formed with a body portion B which may be of hexagonal form, as shown in Figs. 1 and 3, or of round form, as shown in Fig. 7, or any other suitable shape. The nut is formed with a top plate or portion A', and with an extension or neck C projecting therefrom in the same direction as the body portion B, and of smaller diameter than the body portion, so as to form between them an annular groove, channel, or recess M. The extension C is screw-threaded on either or both sides, being commonly formed with an interior screw-thread D to screw upon the external threads of a bolt, valve shell, or other screw-threaded part. When desired, it may be also formed with an exterior screw-thread F, as shown in Fig. 8.

Figure 2:
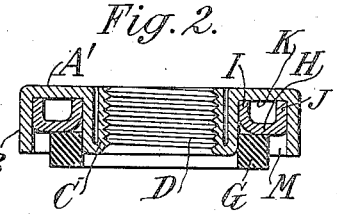
Fig. 2 is a diametrical section of the nut.

The body portion B is adapted to bear either directly or indirectly against a wheel felly or rim, or some other part, and is of such thickness and strength of metal as to be substantially rigid under the conditions of use. It is found in practice that it does not require metal of any considerable thickness to adequately sustain the strains in use. If the extension C is made of a single thickness of such metal, the cutting of threads D and F on both sides would leave too little material for the strength required. It is hence desirable, when both inner and outer screw-threads are to be formed, to increase the thickness of the metal at this point, and, accordingly, in the construction shown, the extension C is made of two thicknesses of sheet metal which may lie close together, or may be separated to some extent if desired. In the construction shown the metal forming the top A' of the nut is extended inwardly until it lies parallel with the metal of the exterior of the extension, as clearly shown in Figs. 2 and 8.

Figure 4:
Fig. 4 is an elevation of the filler.
Figure 5:
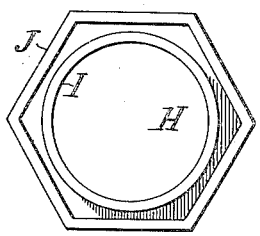
Fig. 5 is a bottom plan of the filler.

It is desirable, in some instances, to provide a packing ring or washer G for the nut, and this may be formed of a suitable thickness of leather, rubber, or other material. The channel or recess M is designed to hold and confine this washer while leaving the latter projecting beyond the face of the nut. If the body portion B is designed to have a considerable depth in order that it may be engaged by a wrench, or in order that a secure finger-hold may be obtained if knurled as in Fig. 6, it is found that the recess thus formed in the body portion, when a metal of suitable thinness is used, is deeper than the thickness of a leather or other usual washer, so that the washer fails to project beyond the face of the nut. Hence, it is desirable to provide a filling piece H, the principal function of which is to diminish the effective depth of the annular recess, although it may also be useful as increasing the strength of the nut. This filling piece may be cut from solid metal, as shown at H' in Fig. 6, but according to the present invention it is preferably formed of sheet metal and comprises an annular member with an inner flange I and an outer flange J, which rest upon the inner face K of the top portion A' of the nut. The packing washer G in turn rests upon the filler. Preferably, in the case of a hexagonal nut, the outer edge of the filler is similarly formed, as shown in Figs. 4 and 5, but its inner edge or opening is preferably round to embrace the exterior of the extension C. In either hexagonal or other nuts, however, it is usually desirable to form the packing washer G of circular shape, as best seen in Fig. 3, since this shape is less liable to become distorted when the nut is screwed up.

In forming the improved nut it is preferable to start with a flat piece of metal which is gradually cupped to form the extension, and the bottom of the cup is pressed in a contrary direction by a series of operations until it projects inwardly sufficiently to form the inturned portion of the extension. At a suitable point in the operation the bottom of the cup is perforated in order to assist the formation. By preference the extension is practically completed before the circular flange is drawn into hexagonal or round form. The filler H is formed with a comparatively loose fit, and after it has been adjusted in place it may be given an inward blow with a punch or hammer, thus expanding it sufficiently to tightly grip the interior wall of the body of the nut. No other method of connection is usually necessary. The packing washer G contacting at several points around the interior periphery of the body of the nut is held in place by friction with sufficient firmness.

Figure 6:
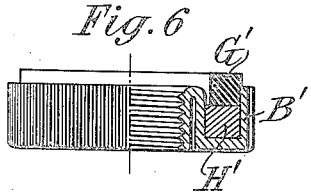
Fig. 6 is a view, partly in elevation and partly in section, of a modified construction illustrating the use of a solid filler.

In Figs. 6 and 7 is illustrated a nut having a round body portion B' which is preferably knurled in order to provide a finger grip or wrench faces. In this construction a solid filling piece H' is provided, while the packing washer G' may be circular as before.

In Fig. 8 is illustrated a form of nut in which the extension C' is formed within the body B² of the nut. In this construction the extension may be screw-threaded on both sides as illustrated, or one of these sides may be left unthreaded. In this construction an annular recess M is provided which may receive a filling piece and packing washer, or either alone.

In either of the constructions shown the filling piece may be brought out to the edge of the body portion, or may be omitted entirely.

While several embodiments of the invention have been shown and described, it is understood that the invention is not limited to such constructions, but within the scope of the appended claims is capable of various changes and modifications.

The present application is a division of my application filed July 25, 1914, Serial No. 853,127, being directed to the subject-matter thereof descriptive of Fig. 8 of said application, which subject-matter is not specifically claimed in said application.

I claim as my invention:—

1. A sheet metal structure comprising an outer body portion, a top portion and an inner tubular cylindrical extension projecting from such top portion in the same direction as the body portion and confined substantially within the length of the body portion, and forming between them a continuous annular channel or recess which is open and accessible on one side, and a removable annular part confined in such recess.

2. A nut according to claim 1, with a packing washer confined in such recess.

3. A nut according to claim 1, with a filling piece confined in such recess.

4. A nut according to claim 1, with a filling piece and packing washer confined in such recess.

5. A nut according to claim 1, with a filling piece of sheet metal confined in such recess.

6. A nut according to claim 1, with a filling piece of sheet metal, having inner and outer flanges, confined in such recess.

7. A sheet metal structure having a central opening and comprising an outer body portion, a top portion, and an inner tubular cylindrical extension projecting from such top portion in the same direction as the body portion, and to the same extent, and forming between them a continuous annular channel or recess which is open and accessible on one side, and a removable annular part confined in such recess.

8. A sheet metal structure according to claim 7, with a washer confined in such recess.

9. A sheet metal structure according to claim 7, with a filling piece confined in such recess.

10. A sheet metal structure according to claim 7, with a filling piece and packing washer confined in such recess.

11. A nut formed of sheet metal having exterior wrench faces and a screw-threaded interior portion of less diameter, with an annular channel or recess formed between such portions, and a packing washer confined in such recess.

12. A nut formed of sheet metal having exterior wrench faces and a screw-threaded interior portion of less diameter, with an annular channel or recess formed between such portions, and a sheet metal filling piece confined in such recess.

13. A nut formed of sheet metal, with a body portion having exterior wrench faces, a top portion, and an inner tubular screw-threaded extension projecting from such top portion in the same direction as the body portion and to the same extent, and forming between them a continuous annular channel or recess which is open and accessible.

In witness whereof, I have hereunto signed my name.

HENRY P. KRAFT.